United States Patent [19]
Cho

[11] Patent Number: 6,121,980
[45] Date of Patent: Sep. 19, 2000

[54] VERTEX-BASED PREDICTIVE SHAPE CODING METHOD USING ADAPTIVE SAMPLING DIRECTION SELECTION

[75] Inventor: Dae-sung Cho, Seoul, Rep. of Korea

[73] Assignee: Samsung Electronics Co., Ltd., Suwon, Rep. of Korea

[21] Appl. No.: 08/994,051

[22] Filed: Dec. 19, 1997

[30] Foreign Application Priority Data

Jan. 10, 1997 [KR] Rep. of Korea ............................ 97-506

[51] Int. Cl.⁷ ..................................................... G06K 9/00
[52] U.S. Cl. ............................................ 345/441; 382/242
[58] Field of Search .................................... 345/441, 442; 382/243, 244, 242

[56] References Cited

U.S. PATENT DOCUMENTS

| | | | |
|---|---|---|---|
| 5,524,064 | 6/1996 | Oddou et al. ............................. | 382/180 |
| 5,737,449 | 4/1998 | Lee ........................................... | 382/242 |
| 5,828,790 | 10/1998 | Kim ........................................ | 382/242 |
| 5,838,830 | 11/1998 | Qian et al. ............................... | 382/243 |
| 5,898,439 | 4/1999 | Takazawa ................................. | 345/441 |
| 5,907,639 | 5/1999 | Kim ........................................ | 382/242 |

Primary Examiner—Mark Zimmerman
Assistant Examiner—Cliff N. Vo
Attorney, Agent, or Firm—Burns, Doane, Swecker & Mathis, LLP

[57] ABSTRACT

A vertex-based shape coding method and an inter-frame vertex predicting method are provided. The vertex-based shape coding method comprises the steps of: (a) selecting predetermined vertices to code an original curve, when the two-dimensional curve representing the shape of the object is set as the original curve; (b) additionally selecting a new vertex to eliminate ambiguously corresponding points, when the foot of a perpendicular drawn from one point on a straight line formed by sequentially connecting the vertices to a reference vertical or horizontal axis extends up to the original curve, an intersection point between the extended line and the original curve is set as a corresponding point, and at least one intersection point between the original curve and one point on the straight line is set as the ambiguously corresponding point; (c) sampling an error into predetermined sections with respect to the reference vertical or horizontal axis, when a difference between the original curve and the straight line with respect to the reference vertical or horizontal axis is set as the error; and (d) coding the selected vertices and the sampled errors.

4 Claims, 6 Drawing Sheets

——: ORIGINAL CURVE
-----: A SET OF POLYGON LINES
—·—: AN ERROR BETWEEN A PIXEL ON ORIGINAL CURVE AND A PIXEL ON POLYGON LINE

VERTEX-BASED PREDICTIVE SHAPE CODING METHOD USING ADAPTIVE SAMPLING DIRECTION SELECTION

BACKGROUND OF THE INVENTION

1. Field of the Invention

2. Description of Related Art

Video database or video transmission appears as the core of future multi-media technologies. Most visible objects recognized by human beings can be fundamentally represented as a shape and a internal texture. The future video processing technologies aim at processing a unit of an object or its content perceived by human being rather than of a unit of each frame. Particularly, an international image coding standard such as Moving Picture Experts Group 4 (MPEG4) have content-based processing as its main target. Accordingly, a two-dimensional curve coding method has been used as a fundamental means in depicting the image of an object.

In general, the shape of a given two-dimensional curve can be coded by polygonal approximation. Also, the coded curve can be coded once more. For this, an error between an original curve segment and an approximated straight line between two original vertices (hereafter polygon line) should be calculated. Various methods can be applied to an error sampling method for obtaining the error between the original curve and the polygon line. As one example, there is a method for obtaining a distance between one point on the original curve and one point on the polygon line as shown in FIG. 1.

To reduce the amount of coded error values, N samples are taken from a polygon line. The interval between two samples is equivalent to the next interval of two samples. In order to select vertices to make polygon lines, first set two points on an original curve, having maximum distance between them, as two initial vertices. FIG. 2 shows a conventional vertex selection method using a length between an original curve and polygon line. Referring to FIG. 2, if an error between an pixel on a original curve and a pixel on polygon line is more than or equal to a predetermined critical value in the case of vertices A and B, a new vertex is added on the original curve between the two vertices A and B. The aforementioned error is a value obtained by measuring a distance of a pixel on the original curve and the pixel on polygon line between A and B. Here, when a point is set as (x1 and y1) and an equation of a straight line between the vertices A and B is set as 'ax+by+c=0', the vertical distance d can be calculated as follows:

$$d = \frac{|ax_1 + by_1 + c|}{\sqrt{a^2 + b^2}} \quad (1)$$

When the point C has a maximum value d of Equation 1 among all points on the original curve between the vertices A and B and the distance d is greater than or equal to a predetermined critical value, the point C is set as a new vertex. This process is performed on every vertex and repeated until a newly-added vertex does not exist.

In order to remove errors between an original curve and polygon line and get lossless results after coding, all points on the original curve are set as vertices and the vertices should be coded since there are a plurality of intersected points of an original curve with the lines perpendicular to the polygon line in each sample position. However, the coding of every point on the original curve causes degradation of coding efficiency. Particularly, a coder using prediction with respect to information on shape between two frames which are successive in respect of time must predict every point, which is impossible in practice.

In a lossy coding method, an error sampling method as in FIG. 3 is utilized. That is, Equation 1 is applied to each point $(x_i, y_i)$ such as X0, X1, ..., X8 on an original curve. When an error sampling is performed with respect to the original curve! a denominator of Equation 1 does not need to be calculated again since the polygon line is fixed. However, at least two multiplications ($ax_1, by_1$), two additions ($ax_1+by_1$, $by_1+c$) and a division are required, and the amount of calculation is large. Also, when more than one point of the original curve intersects with the lines perpendicular to the polygon line during the error sampling (even in the case of the lossy coding), it is not easy to find a point, which minimally degrades quality from the intersection points. Therefore, it is difficult to design an efficient coder.

When the coded errors are reconstructed into the original image, the positions of A0, A1, ..., A8 of FIG. 3 should not be changed during coding because coding and decoding must be accomplished on the basis of the polygon line on the basis that there is no information on the original curve during reconstruction. Accordingly, in order to code or decode an error, vertical distances between pre-defined points A0, A1, ..., A8 on the coded straight line of FIG. 3 and the original curve should be measured instead of using a method of drawing the foot of a perpendicular from the points on the original curve to the coded straight line. For this, intersections of the perpendiculars drawn upward from the A0, A1, ..., A8 with the original curve are obtained and set as X0, X1, ..., X8, respectively. Then, the lengths of the perpendiculars drawn upward from the A0, A1, ..., A8 to the original curve are calculated, thereby obtaining an error suitable for the coding or decoding. However, in such a method, the perpendiculars drawn upward from A0, A1, ..., A8 may not be correctly consistent with the original curve, thereby lowering the efficiency of coding.

SUMMARY OF THE INVENTION

An object of the present invention is to provide a vertex-based predictive shape coding method comprising a simplified error coding technique and vertex prediction using previous shape information, where the method is capable of eliminating intersected points on an original curve with a line perpendicular to the horizontal or vertical reference axis to make one-to-one correspondence and reducing the amount of sample error calculation using adaptive vertical/horizontal sampling selection.

To accomplish the above object, there is provided a vertex-based shape coding method comprises the steps of: (a) selecting predetermined vertices to code an original curve, when the two-dimensional curve representing the shape of the object is set as the original curve; (b) additionally selecting a new vertex to eliminate the case in which there are a plurality of error sample points on an original curve intersected with a line perpendicular to the horizontal or vertical reference axis, where the reference axis is selected based on the inclination of the polygon line; (c) obtaining an error sample between the original curve and the polygon line by using a simple distance between a point on polygon line and a point on the original curve in the horizontal or vertical direction based on the vertical or horizontal reference axis respectively, where the two points intersect with the line perpendicular to the horizontal or vertical reference axis, and taking K samples from a polygon line, where an interval between two samples is equivalent to next interval of two neighboring samples; and (d) coding the selected vertices and the sampled errors.

To accomplish the above object, there is provided an inter-frame vertex predicting method comprising the steps of: selecting two vertices on an original curve of a previous frame as temporary vertices and selecting two vertices of a present frame corresponding to the position of the temporary vertices, when a two-dimensional curve representing the shape of an object is set as an original curve; controlling the predicted vertices to be placed on on original curve of the present frame when a difference between an original curve of two vertices predicted in the present frame with respect to a reference vertical or horizontal axis and an original curve of the temporary vertices of a previous frame is smaller than a predetermined critical value; predicting a corresponding vertex of a present frame by setting the next vertex as a temporary vertex, when a temporary vertex of the previous frame is not the last vertex or a difference between the original curve of the previous frame and the original curve of the present frame is larger than a predetermined critical value; and additionally selecting a new vertex unpredicted from a previous frame in the present frame, after predicting a present frame vertex due to all vertices of a previous frame since the previous frame temporary vertex is the last one.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
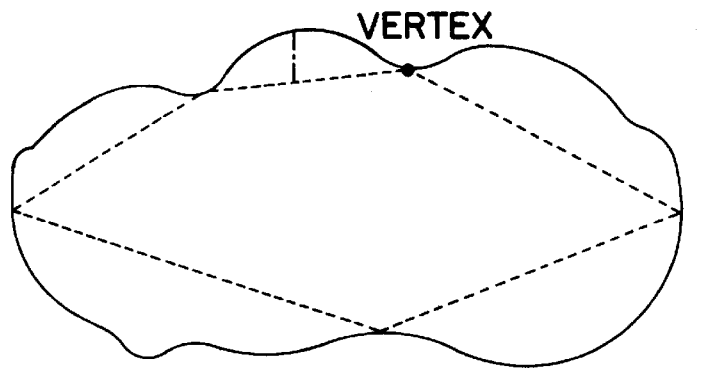
FIG. 1 shows an original curve and a curve coded by polygonal approximation.
Figure 2:
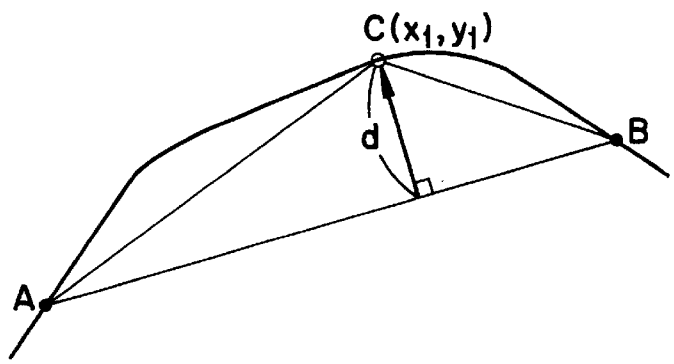
FIG. 2 illustrates a conventional vertex selecting method using a maximum length between original and coded curves.
Figure 3:
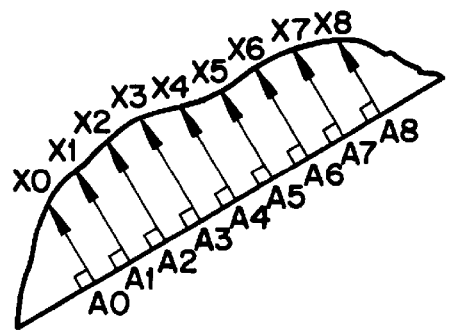
FIG. 3 illustrates a conventional method of obtaining an error by measuring the lengths of perpendiculars drawn from the polygon line to the original curve.
Figure 4:
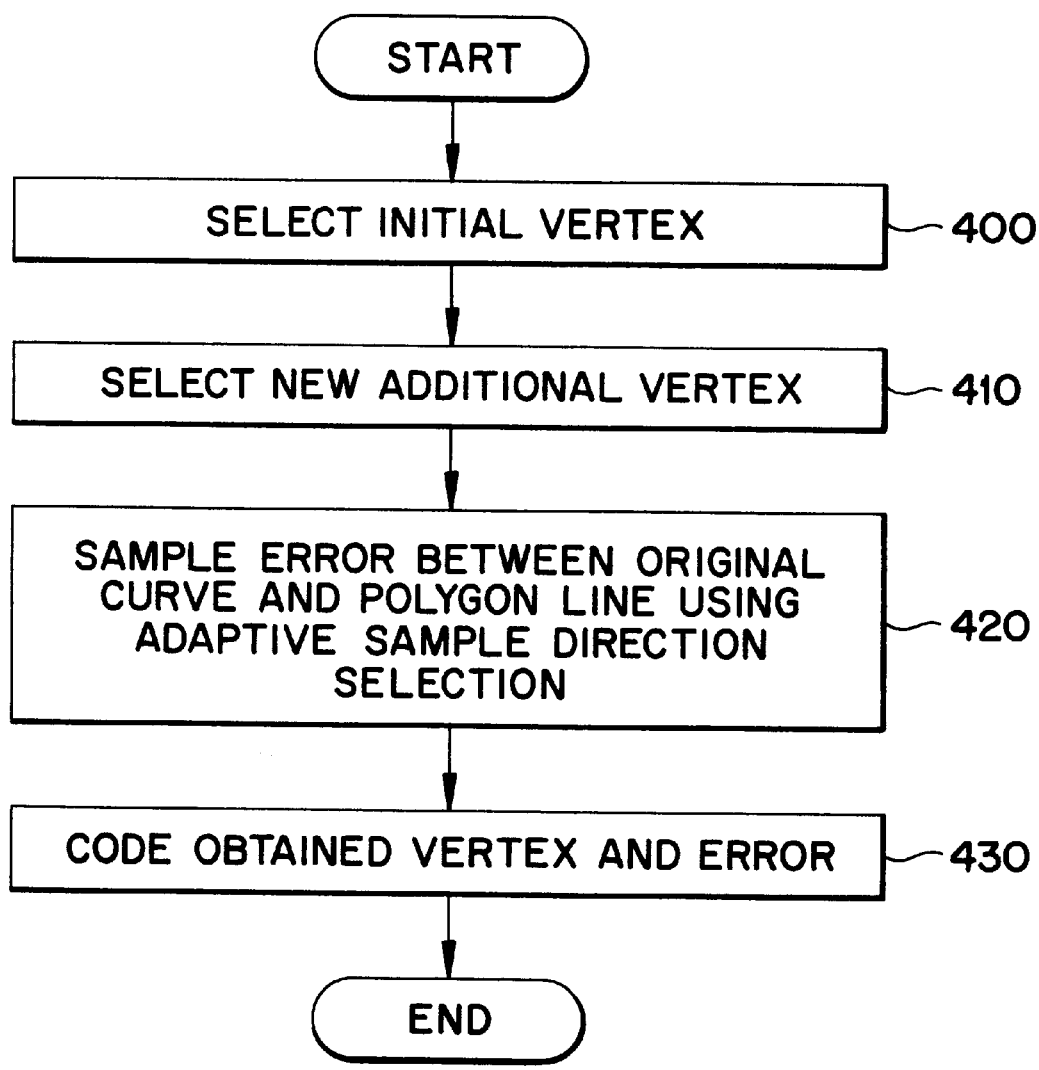
FIG. 4 is a flowchart for outlining a vertex-based shape coding method according to the present invention.

FIG. 4 illustrates a vertex-based coding method according to the present invention which is a method for coding vertices for approximating an original curve and an error between polygon formed by connecting two vertices and the original curve. Referring to FIG. 4, the vertex-based shape coding method comprises a vertex selecting step 400, an additional vertex selecting step 410, a sampling step 420 and a coding step 430.

Two initial vertices for approximating an original curve are selected in step 400. New vertices are additionally selected to eliminate the case in which there are a plurality of error sample points on an original curve intersected with a line perpendicular to the horizontal or vertical reference axis, in step 410. An error between the original curve and a polygon line formed by connecting the selected vertices to each other is obtained from each sampling point by setting a length of sampling interval to "1" in the case of a lossless coding and setting a predetermined length of sampling interval greater than "1" in the case of lossy coding, in step 420. The obtained vertex and error are coded through differential pulse code modulation (DPCM) and discrete cosine transform (DCT), in step 430.

Figure 5:
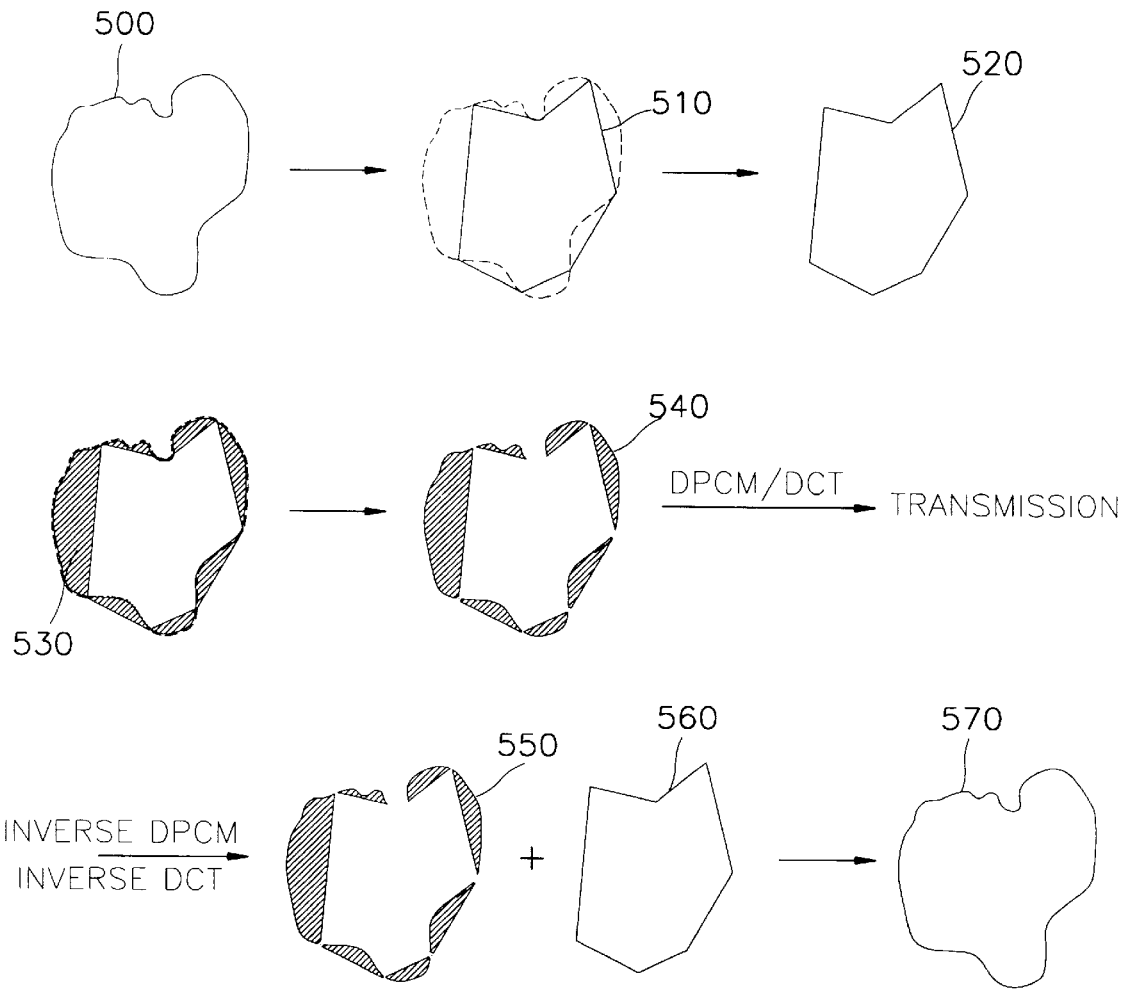
FIG. 5 is a schematic view showing contour coding and decoding methods using polygonal approximation and DPCM/DCT.

FIG. 5 schematically shows the above-described process. Referring to FIG. 5, the shape of an input original curve 500 approximated (520) by the polygonal approximation (510). This is called a first coding curve. Reference numeral 530 is a first coded error. The first coded error 530 undergoes an error sampling step 540, and is compensated by a prediction coding method such as the DCPM in the case of the lossless coding and by a transform coding method such as the DCT in the case of the lossy coding. The coded errors are again decoded (550) by their inverse DPCM/DCT. When the resultant structure is added to a first coded/decoded curve 560, it becomes the original curve 500 (in the case of the lossless coding) or becomes an approximated curve 570 (in the case of the lossy coding).

Figure 6:
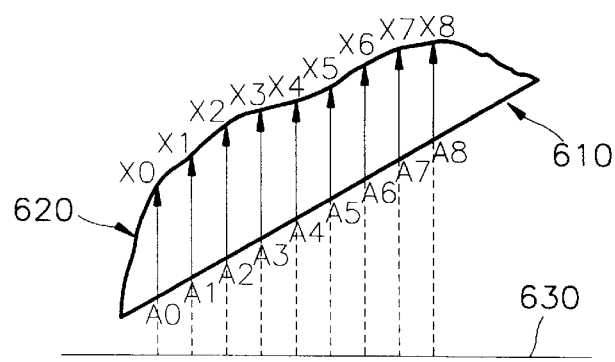
FIG. 6 shows an error measuring method for measuring vertical distances on the basis of a horizontal axis, as an example of the error sampling method of FIG. 4.
Figure 7:
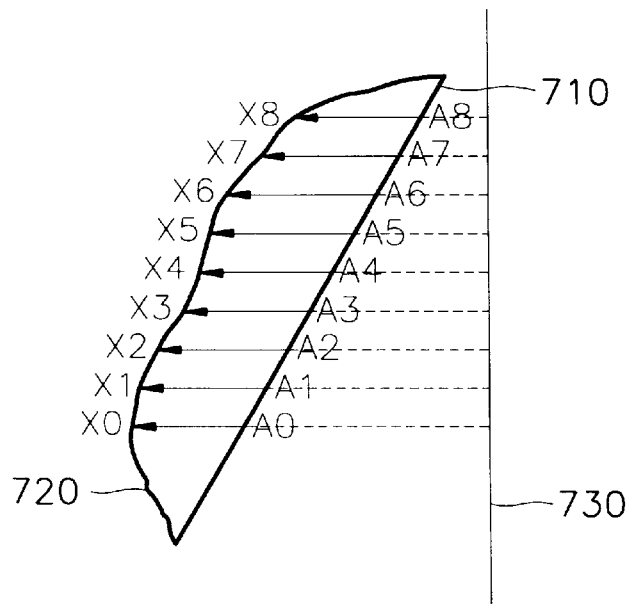
FIG. 7 shows an error measuring method for measuring horizontal distances on the basis of a vertical axis, as an example of the error sampling method of FIG. 4.

In the error sampling method for the lossy coding as shown in FIGS. 6 and 7, an error between an original curve and a polygon line is obtained in each sampling position by measuring a distance between them with respect to a horizontal or vertical axis at each sampling position, where the distance is simply calculated using 1 "minus" operation. FIG. 6 illustrates an error sampling method in the case that the inclination of the polygon line is lower than or equal to 0.5. Errors |X0–A0|, . . . , |X8–A8| in FIG. 6 are calculated by determining a horizontal axis 630 and subtracting a distance between the horizontal axis 630 and the polygon line 610 from a distance between the horizontal axis 630 and the original curve 620.

FIG. 7 illustrates an error sampling method in the case that the inclination of the polygon line is higher than 0.5. Errors in FIG. 7 are calculated by determining a vertical axis 730 and subtracting a distance between the vertical axis 730 and a polygon line 710 from a distance between the vertical axis 730 and an original curve 720. Reference characters A0, . . . , A8 in FIGS. 6 and 7 denote sampling sections which must maintain a certain interval from either side of an encoder and a decoder.

Figure 8:
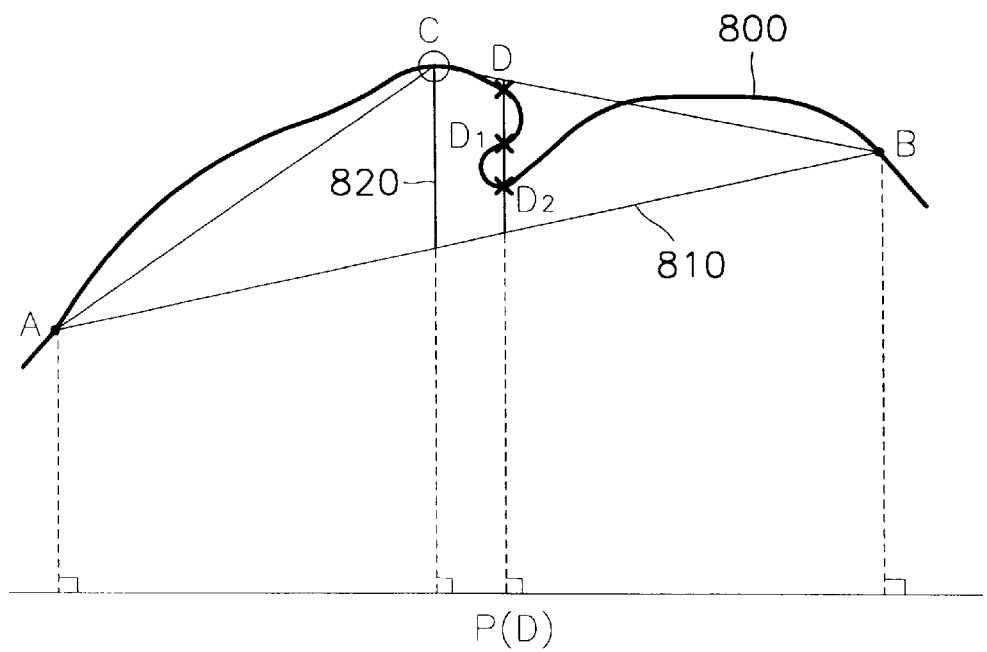
FIG. 8 shows a vertex selecting method for a lossless coding.

Points on the original curve should correspond to points on the horizontal or vertical axis one-to-one, in order to accomplish a lossless coding for the obtained error samples with respect to all points on the polygon line, or to increase efficiency of the lossy coding. A point having a maximum vertical or horizontal distance is selected as a new vertex if there are a plurality of error sample points on an original curve intersected with a line perpendicular to the horizontal or vertical reference axis. For example, as shown in FIG. 8, when there are several points $D_1$, $D_2$ and D on the original curve 800 at the same sampling position P(D) on the horizontal axis, a point C having a maximum distance 820 from the polygon line 810 between the vertices A and B to the original curve 800 is selected as a vertex. Then, the aforementioned vertex selection process is again repeated for the one-to-one correspondence.

Figure 9:
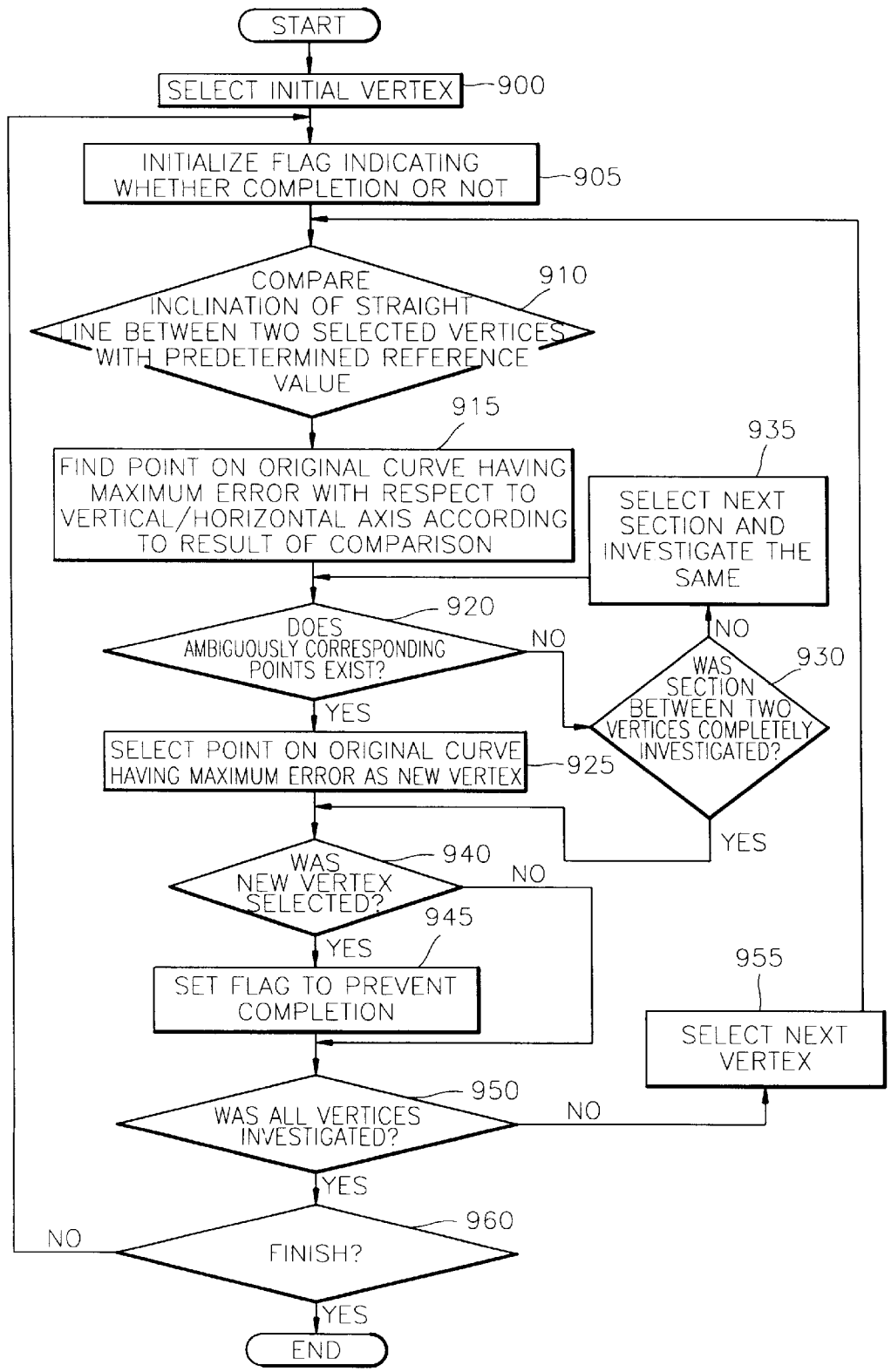
FIG. 9 is a flowchart for outlining the vertex selecting method of FIG. 4.

FIG. 9 is a flowchart of the vertex selection method according to FIG. 4. Referring to FIG. 9, the vertex selecting method includes steps (900 and 905) of selecting an initial vertex, steps (910 and 915) of obtaining an error between an original curve and an approximated straight line at the initialized vertex, steps (920 to 945) of selecting a point having a maximum error as a new vertex when there are one more intersected error sample points, and steps (950 to 960) of repeating the above procedure with respect to all vertices.

The above steps will now be described in more detail. First, two vertices having a longest straight line among vertices on the original curve are selected as initial vertices in step 900. A flag indicating whether it is completed or not is initialized in step 905. If the inclination of the straight line between the two initial vertices selected in step 900 is greater than or equal to 0.5, a maximum horizontal error distance between the original curve and the polygon line with respect to a vertical axis is selected otherwise, a maximum vertical error distance between the original curve and the polygon line with respect to a horizontal axis is selected, in step 915. A detection of whether there are one more intersected sample points between the two vertices is made in step 920. If they exist, a point having a maximum error distance is selected as a new vertex, in step 925. Otherwise, a check of whether the section between the two vertices is completely investigated is made in step 930. If it is not completely investigated, a next section is selected to check whether there is one more selected points or not, in step 935. If the there are one or more sampling points or the section between two vertices is completely investigated, whether a new vertex is selected or not is checked in step 940. If a new vertex is selected, a flag is set to prevent completion of the entire process to again select another new vertex not to have one more intersected sample points, in step 945. A determination of whether all vertices are investigated or not is made in step 950. If a new vertex is not selected, the step 950 is performed without step 945. If vertices are not completely investigated in step 950, the next vertex is selected and steps 910 through 950 are repeated in step 955. If vertices are completely investigated, a flag indicating whether it is completed or not is checked via step 960. At step 960 if flag is set to prevent the completion, the aforementioned process is repeated to additionally select a new vertex by returning to step 905.

Figure 10:
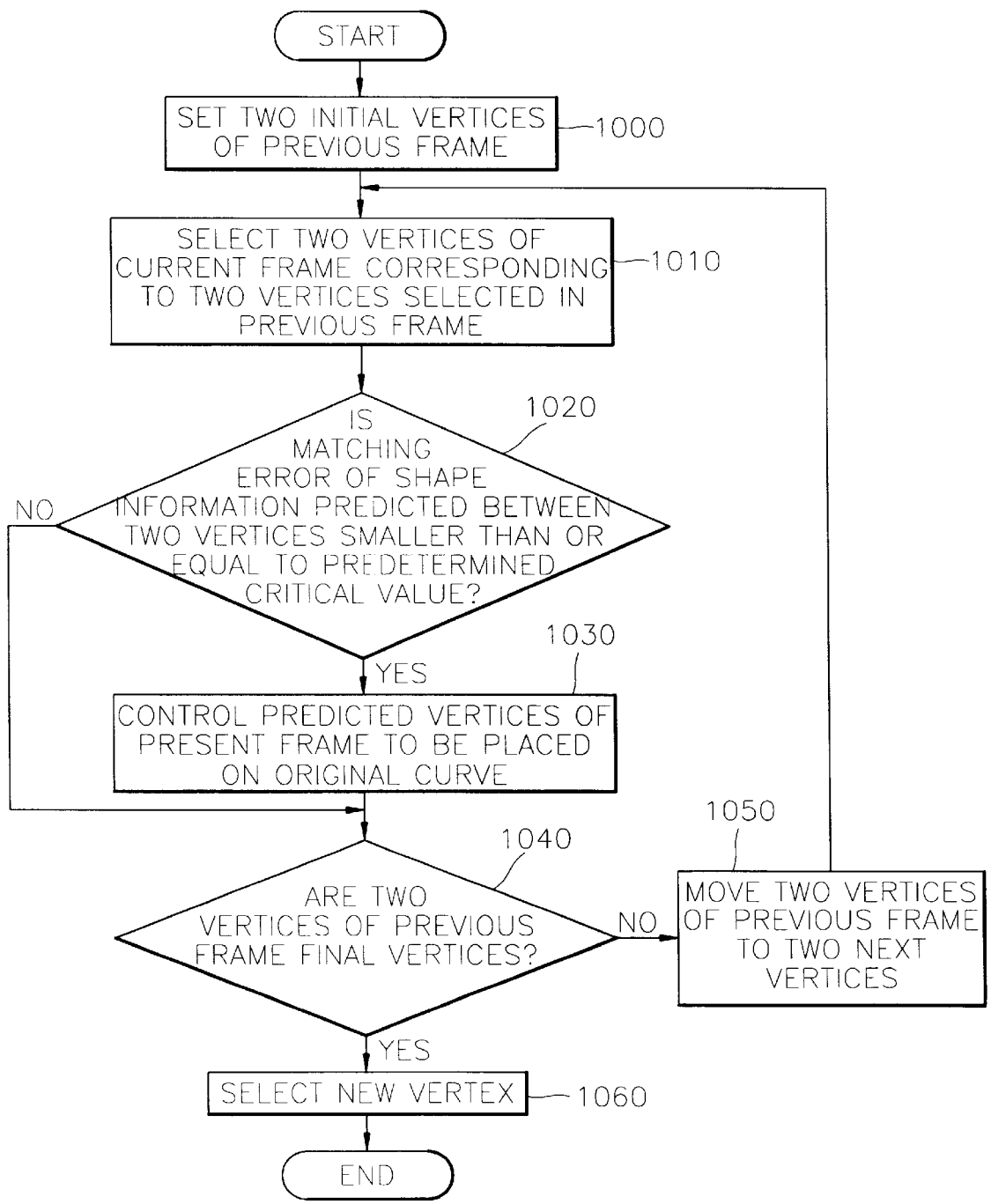
FIG. 10 is a flowchart for outlining a method of predicting a vertex between shape information of two continuous frames according to the present invention.

FIG. 10 is a flowchart outlining a vertex predicting method for a prediction coding between shape information of two frames. Referring to FIG. 10, the vertex predicting method includes steps (1000 and 1010) of predicting a vertex from a previous frame, steps (1020 and 1030) of controlling a predicted vertex when an error between an original curve of the predicted vertex and an original curve of a corresponding vertex in the previous frame is small, steps (1040 and 1050) of making a prediction with respect to all vertices, and a step 1060 of selecting a new vertex between the predicted vertices when the aforementioned error is large.

The above steps will be described in more detail. First, two initial vertices of shape information in a previous frame to be matched with a current original curve are selected in step 1000. Two vertices of a present frame to make a best matching of an original curve between the two selected initial vertices with shape information of a present frame, e.g., two vertices on the original curve of the previous frame, are selected as temporary vertices. Two vertices at a present frame corresponding to the position of the temporary vertices are selected (predicted), in step 1010. A determination of whether an error between two original curves is smaller than or equal to a critical value between two vertices of each frame is made, in step 1020. If the error is smaller than or equal to the critical value, it denotes that vertex prediction was well performed, so two vertices predicted from a previous frame are controlled to be placed on the original curve of a present frame in step 1030. A determination of whether the two vertices selected in the previous frame are final vertices or not is made in step 1040. If the error is larger than the critical value, step 1040 is immediately performed without undergoing step 1030. If it is determined in step 1040 that the two selected vertices are not the final vertices, two next vertices are selected in a previous frame, in step 1050. Then, the procedure returns to the step 1010 to predict other vertices of a present frame. If it is determined in step 1040 that the two selected vertices are the final vertices, a new vertex is selected between the predicted vertices to prevent one more intersected points at the same sample position from being generated due to unpredicted vertices other than the vertices of a present frame predicted in step 1010, by the vertex selecting method as shown in FIG. 9, in step 1060.

According to the present invention, when the shape of a two-dimensional object is coded or decoded, a vertex selecting process is fast, and an original curve and an polygon line correspond to each other in an one-to-one way. Thus, efficient lossless/lossy coding performance is provided. Also, a lossless coding using a prediction between shape information of adjacent frames is possible, so that a conventional lossless coding performance using only information in one frame can be improved.

What is claimed is:

1. A vertex-based shape coding method for coding a two-dimensional curve on the basis of predetermined vertices selected in the shape of an object, when said two-dimensional curve representing the shape of said object is coded, said method comprising the steps of:

(a) selecting predetermined vertices to code an original curve, when said two-dimensional curve representing the shape of said object is set as said original curve;

(b) additionally selecting a new vertex to eliminate a case in which there are a plurality of error sample points on original curve intersected with a line perpendicular to the horizontal or vertical reference axis, where the reference axis is adaptively selected in each polygon line based on the inclination of the polygon line;

(c) obtaining an error sample between original curve and polygon line by using a sample distance between a point on polygon line and a point on original curve in the horizontal or vertical direction based on the vertical or horizontal reference axis respectively, where the two points intersect with the line perpendicular to the horizontal or vertical reference axis, and taking K samples from a polygon line, where an interval between two samples is equivalent to the next interval of two neighboring samples; and (d) coding said selected vertices and said sampled errors.

2. The vertex-based shape coding method as claimed in claim 1, wherein said step (b) comprises the steps of:

(b1) setting two vertices forming a longest straight line among polygon lines formed by the other two vertices on the original curve, as temporary vertices;

(b2) sampling said error into predetermined sections with respect to said reference vertical axis when the inclination of a straight line connecting said temporary vertices is greater than a predetermined reference value, or with respect to said reference horizontal axis when the inclination of said straight line is smaller than said predetermined reference value, and finding a point having a maximum error among said sampled errors;

(b3) selecting a point having a maximum vertical or horizontal distance as a new vertex if there are a plurality of error sample points on original curve intersected with a line perpendicular to the horizontal or vertical reference axis;

(b4) repeating said steps (b2) and (b3) by setting the next vertex as a temporary vertex until said temporary vertex becomes the last vertex, when said temporary vertex is not the last vertex; and (b5) repeating said steps (b1) through (b4) to prevent said one more intersected points at the same sampling position if said temporary vertex is the last one and a new vertex was selected, and completing said step (b) if said temporary vertex is the last one and said new vertex is not selected.

3. An inter-frame vertex predicting method for coding a present frame by predicting the vertex of said present frame from the vertex of a previous frame, when a two-dimensional curve representing the shape of an object is coded, the method comprising the steps of:

(a) selecting two vertices on an original curve of a previous frame as temporary vertices and selecting two vertices of a present frame corresponding to the position of said temporary vertices, when a two-dimensional curve representing the shape of an object is set as an original curve;

(b) controlling predicted vertices on the current frame matched with said temporary vertices of the previous frame to be placed on the present frame original curve, when a difference between an original curve of two vertices predicted in said present frame with respect to a reference vertical or horizontal axis and an original curve of said temporary vertices of a previous frame is smaller than a predetermined critical value;

(c) predicting a corresponding vertex of a present frame by setting the next vertex as a temporary vertex, when a temporary vertex of said previous frame is not the last vertex or a difference between the original curve of a previous frame and the original curve of a present frame is larger than a predetermined critical value; and (d) additionally selecting a new vertex unpredicted from a previous frame in the present frame, after predicting all vertices of a previous frame since the previous frame temporary vertex is the last one.

4. The inter-frame vertex predicting method as claimed in claim 3, wherein said new additional vertex selection step (d) comprises the steps of:

(d1) setting two vertices forming a longest straight line among polygon lines formed by the other two predicted vertices on the original curve of said present frame, as temporary vertices;

(d2) dividing said error into predetermined sections with respect to said reference vertical axis when the inclination of a straight line connecting said temporary vertices is greater than a predetermined reference value or with respect to said reference horizontal axis when the inclination of said straight line is smaller than the predetermined reference value, and finding a point having a maximum error among said obtained errors;

(d3) selecting a point having a maximum vertical or horizontal distance as a new vertex if there are a plurality of error sample points, between said two temporary points, on original curve intersected with a line perpendicular to the horizontal or vertical reference axis;

(d4) setting the next vertex as a temporary vertex until said temporary vertex becomes the last vertex and repeating said steps (d2) and (d3), when said temporary vertex is not the last vertex; and (d5) repeating said steps (d1) through (d4) to prevent generation of said ambiguously corresponding points, if said temporary vertices are the last vertices and said new vertex was selected, and finishing said new vertex additional selection step (d) if said temporary vertices are the last vertices and said new vertex was not selected.

* * * * *